(12) United States Patent
Rao et al.

(10) Patent No.: US 12,020,428 B2
(45) Date of Patent: Jun. 25, 2024

(54) SYSTEM AND METHODS FOR MEDICAL IMAGE QUALITY ASSESSMENT USING DEEP NEURAL NETWORKS

(71) Applicant: GE Precision Healthcare LLC, Milwaukee, WI (US)

(72) Inventors: Gireesha Chinthamani Rao, Pewaukee, WI (US); Alec Joseph Baenen, Hartland, WI (US); Katelyn Rose Nye, Glendale, WI (US); Prabhu Rajasekaran, Bangalore (IN); Scott Schubert, Wales, WI (US); Raghu Prasad, Bangalore (IN); Keval Harishabhai Jagatiya, Rajkot (IN); Aishwarya Seth, Bangalore (IN); Eric Hart, Muskego, WI (US); Adam Pluim, Brookfield, WI (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 490 days.

(21) Appl. No.: 17/346,028

(22) Filed: Jun. 11, 2021

(65) Prior Publication Data
US 2022/0398718 A1 Dec. 15, 2022

(51) Int. Cl.
*G06T 7/00* (2017.01)
*G06T 7/10* (2017.01)

(52) U.S. Cl.
CPC .............. *G06T 7/0012* (2013.01); *G06T 7/10* (2017.01); *G06T 2207/20076* (2013.01);
(Continued)

(58) Field of Classification Search
CPC . G06T 2207/20076; G06T 2207/20081; G06T 2207/20084; G06T 2207/30061;
(Continued)

(56) References Cited

U.S. PATENT DOCUMENTS 9,895,131 B2  2/2018  Chang et al.
10,624,602 B2  4/2020  Chang et al.
(Continued)

FOREIGN PATENT DOCUMENTS

CN    111476777 A    7/2020

OTHER PUBLICATIONS

Amit Kumar Jaiswal, "Identifying pneumonia in chest X-rays: A deep learning approach," Jun. 4, 2019, Measurement 145 (2019), pp. 511-516.*

(Continued)

*Primary Examiner* — Omar S Ismail
(74) *Attorney, Agent, or Firm* — McCoy Russell LLP

(57) ABSTRACT

The current disclosure provides methods and systems for rapidly and consistently determining medical image quality metrics following acquisition of a diagnostic medical image. In one embodiment, the current disclosure teaches a method for determining an image quality metric by, acquiring a medical image of an anatomical region, mapping the medical image to a positional attribute of an anatomical feature using a trained deep neural network, determining an image quality metric based on the positional attribute of the anatomical feature, determining if the image quality metric satisfies an image quality criterion, and displaying the medical image, the image quality metric, and a status of the image quality criterion via a display device. In this way, a diagnostic scanning procedure may be expedited by providing technicians with real-time insight into quantitative image quality metrics.

14 Claims, 10 Drawing Sheets

(52) U.S. Cl.
CPC ............... *G06T 2207/20081* (2013.01); *G06T 2207/20084* (2013.01); *G06T 2207/30061* (2013.01); *G06T 2207/30168* (2013.01)

(58) Field of Classification Search
CPC ......... G06T 2207/30168; G06T 7/0002; G06T 7/0012; G06T 7/10; G06T 7/11; G06T 7/62

See application file for complete search history.

(56) References Cited

U.S. PATENT DOCUMENTS

| | | | | |
|---|---|---|---|---|
| 2017/0178365 | A1* | 6/2017 | Raupach | G06T 7/0012 |
| 2017/0224302 | A1 | 8/2017 | Von Berg | |
| 2019/0030371 | A1* | 1/2019 | Han | A61N 5/1039 |
| 2019/0122330 | A1* | 4/2019 | Saget | A61F 2/461 |
| 2019/0251694 | A1* | 8/2019 | Han | G06T 7/174 |
| 2019/0318497 | A1* | 10/2019 | Zhao | A61B 6/0407 |
| 2019/0336095 | A1* | 11/2019 | Ritter | G06T 7/11 |
| 2020/0085382 | A1* | 3/2020 | Taerum | G06T 7/0016 |
| 2020/0160980 | A1* | 5/2020 | Lyman | G06T 5/94 |
| 2020/0196987 | A1* | 6/2020 | Kim | G01S 7/52049 |
| 2020/0357118 | A1* | 11/2020 | Yao | G06N 3/045 |
| 2021/0106314 | A1* | 4/2021 | Aladahalli | G06V 10/26 |
| 2021/0312629 | A1 | 10/2021 | Cheng | |

OTHER PUBLICATIONS

Mark Cicero,"Training and Validating a Deep Convolutional Neural Network for Computer-Aided Detection and Classification of Abnormalities on Frontal Chest Radiographs," Oct. 24, 2016, Investigative Radiology,vol. 52, No. 5, May 20,pp. 281-285.*

Muhammad Arsalan,"Artificial Intelligence-Based Diagnosis of Cardiac and Related Diseases," Mar. 23, 2020,Journal Clinical Medicine 2020, 9, 871,pp. 1-21.*

Amir H. Abdi,"Automatic Quality Assessment of Echocardiograms Using Convolutional Neural Networks: Feasibility on the Apical Four-Chamber View," Jun. 1, 2017,IEEE Transactions on Medical Imaging, vol. 36, No. 6, Jun. 2017,pp. 1221-1229.*

Sérgio Perei,"Brain Tumor Segmentation Using Convolutional Neural Networks in MRI Images,"Apr. 29, 2016,IEEE Transactions on Medical Imaging, vol. 35, No. 5, May 2016,pp. 1240-1249.*

Shuo Wang,"Central focused convolutional neural networks: Developing a data-driven model for lung nodule segmentation," Jun. 30, 2017, Medical Image Analysis 40 (2017), pp. 172-180.*

Changmiao Wanga,"Lung nodule classification using deep feature fusion in chestradiography," Nov. 10, 2016,Computerized Medical Imaging and Graphics 57 (2017),pp. 10-16.*

Hojjat Salehinejad,"Synthesizing Chest X-Ray Pathology for Training Deep Convolutional Neural Networks," May 1, 2019,IEEE Transactions on Medical Imaging, vol. 38, No. 5, May 2019,pp. 1197-1204.*

Zhaoye Zhou,"Deep convolutional neural network for segmentation of knee joint anatomy," Mar. 31, 2018, International Society for Magnetic Resonance in Medicine 2018, pp. 2759-2766.*

Krantz, W. et al., "Chest Radiographs," Clerkship Directors in Emergency Medicine, Available as Early as Sep. 26, 2017, 32 pages.

Walter, D., "8 key clinical applications of machine learning in radiology," Radiology Business, Available Online at https://www.radiologybusiness.com/topics/artificial-intelligence/8-key-clinical-applications-machine-learning-radiology, Jun. 26, 2018, 3 pages.

Steiner, D., "Developing Deep Learning Models for Chest X-rays with Adjudicated Image Labels," Google AI Blogs, Available Online at https://ai.googleblog.com/2019/12/developing-deep-learning-models-for.html, Dec. 3, 2019, 4 pages.

Dutta, A. et al., "The VIA Annotation Software for Images, Audio and Video," Proceedings of the 27th ACM International Conference on Multimedia (MM '19), Oct. 21, 2019, Nice, France, 5 pages.

Lloyd-Jones, G., "Chest X-ray Quality Rotation," Radiology Masterclass, Available Online at https://www.radiologymasterclass.co.uk/tutorials/chest/chest_quality/chest_xray_quality_rotation, Available as Early as Feb. 2020, 2 pages.

"Welcome to the world premiere of YSIO X.pree1," Siemens Healthineers Website, Available Online at https://www.siemens-healthineers.com/en-us/radiography/ysio-xpree-launch, Retrieved on Apr. 21, 2021, 5 pages.

Database Embase [Online] Elsevier Science Publishers, Amsterdam, NL; Mar. 1, 2020 (Mar. 1, 2020), Arsalan M et al: "Artificial intelligence-based diagnosis of cardiac and related diseases", XP002809107, Database accession No. EMB-002004111045.

EP application 22176845.0 filed Jun. 1, 2022—partial Search Report issued May 12, 2023; 15 pages.

* cited by examiner

SYSTEM AND METHODS FOR MEDICAL IMAGE QUALITY ASSESSMENT USING DEEP NEURAL NETWORKS

FIELD

Embodiments of the subject matter disclosed herein relate to medical diagnostic imaging. In particular, systems and methods are provided for automatic evaluation of medical image quality using deep neural networks.

BACKGROUND

Image quality assessment is routinely performed by a technician or other personnel following acquisition of a medical image, and may inform the decision to proceed with the currently acquired medical image, or reject the medical image and re-scan the imaging subject. The technician may evaluate the medical image based on various technical factors depending on the type of diagnostic imaging being performed. In one example, during acquisition of a chest x-ray, a technician may evaluate the x-ray image based on lung coverage, a degree of patient rotation, timing of the image acquisition relative to the inspiration/expiration cycle, x-ray beam penetration, etc. Further, a radiologist may evaluate similar technical factors when making a diagnosis based on a medical image. Visually inspecting a medical image to determine if the image satisfies the various relevant image quality criteria may reduce the speed of the scanning process, as an imaging technician may need to make such an evaluation in order to determine if a scanning procedure should be repeated. Further, visually assessing image quality may introduce an element of subjectivity and variability to the diagnostic imaging process, as there may be variation between the assessments of different technicians/radiologists on a single image, or between different images assessed by a single technician/radiologist. In particular, human assessment of quantitative geometric values in medical images may be prone to variation and may lack precision. Thus, it is generally desired to provide systems and methods for automated image quality assessment, particularly in assessment of quantitative image quality metrics.

SUMMARY

The present disclosure teaches systems and methods which at least partially address the issues described above. In one embodiment, an image quality assessment may be automated by a method comprising, acquiring a medical image of an anatomical region, mapping the medical image to a positional attribute of an anatomical feature using a trained deep neural network, determining an image quality metric based on the positional attribute of the anatomical feature, determining if the image quality metric satisfies an image quality criterion, and responding to the image quality metric not satisfying the image quality criterion by displaying the medical image, the image quality metric, and an indication of the unsatisfied image quality criterion, via a display device.

By automatically determining if a medical image satisfies relevant image quality criteria of a particular imaging protocol, a scanning procedure may be expedited compared to conventional approaches. Further, by displaying the medical image along with the image quality metric, wherein the image quality metric may provide quantitative information regarding one or more aspects of a medical image, more rapid, precise, and repeatable assessment and comparison of medical images may be facilitated.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description provides systems and methods for automatic determination of image quality metrics using deep neural networks, wherein said image quality metrics may be used in the evaluation of one or more image quality criteria. Image quality metrics may comprise quantitative geometrical aspects of a medical image, such as distance between anatomical features (e.g., a mediastinal width), angles formed by anatomical features (e.g., a costophrenic angle), position of an imaging subject relative to an imaging device (e.g., a degree of rotation of an imaging subject with respect to a projection plan of an diagnostic scan), relative sizes of anatomical features (e.g., a cardiothoracic ratio), as well as other aspects which may be indirectly derived from geometrical aspects of a medical image, such as an extent of inspiration/expiration of the lungs of an imaging subject or an extent of overlap between anatomical features. Such geometrical aspects may be difficult for a human, such as an imaging technician or radiologist, to quantify with both precision and consistency. Further, different radiologists/technicians may arrive at different estimations for such geometrical aspects, which may introduce an element of variability into imaging/diagnostic workflows. In particular, during medical image acquisition, determinations of image quality, which may inform a technician's decision whether to accept an acquired medical image or repeat a scan, may be based on said geometrical aspects. Human estimation of geometrical aspects may, in some cases, be a time bottleneck in acquisition of medical images. Thus, it is generally desired to provide systems and methods to quickly, consistently, and precisely, determine such quantitative image quality metrics, particularly in the context of medical image acquisition.

The inventors herein have at least partially addressed the above issues, by providing systems and methods for automatically determining said image quality metrics, using a combination of machine-learning based inference of one or more positional attributes of one or more anatomical features, and expert logic based determination of clinically relevant image quality metrics from said positional attributes. Further, the inventors herein disclose systems and methods for integrating said approach into rapid and computationally efficient determination of image quality criteria during a medical imaging procedure, using the image quality metrics so determined.

Figure 1:
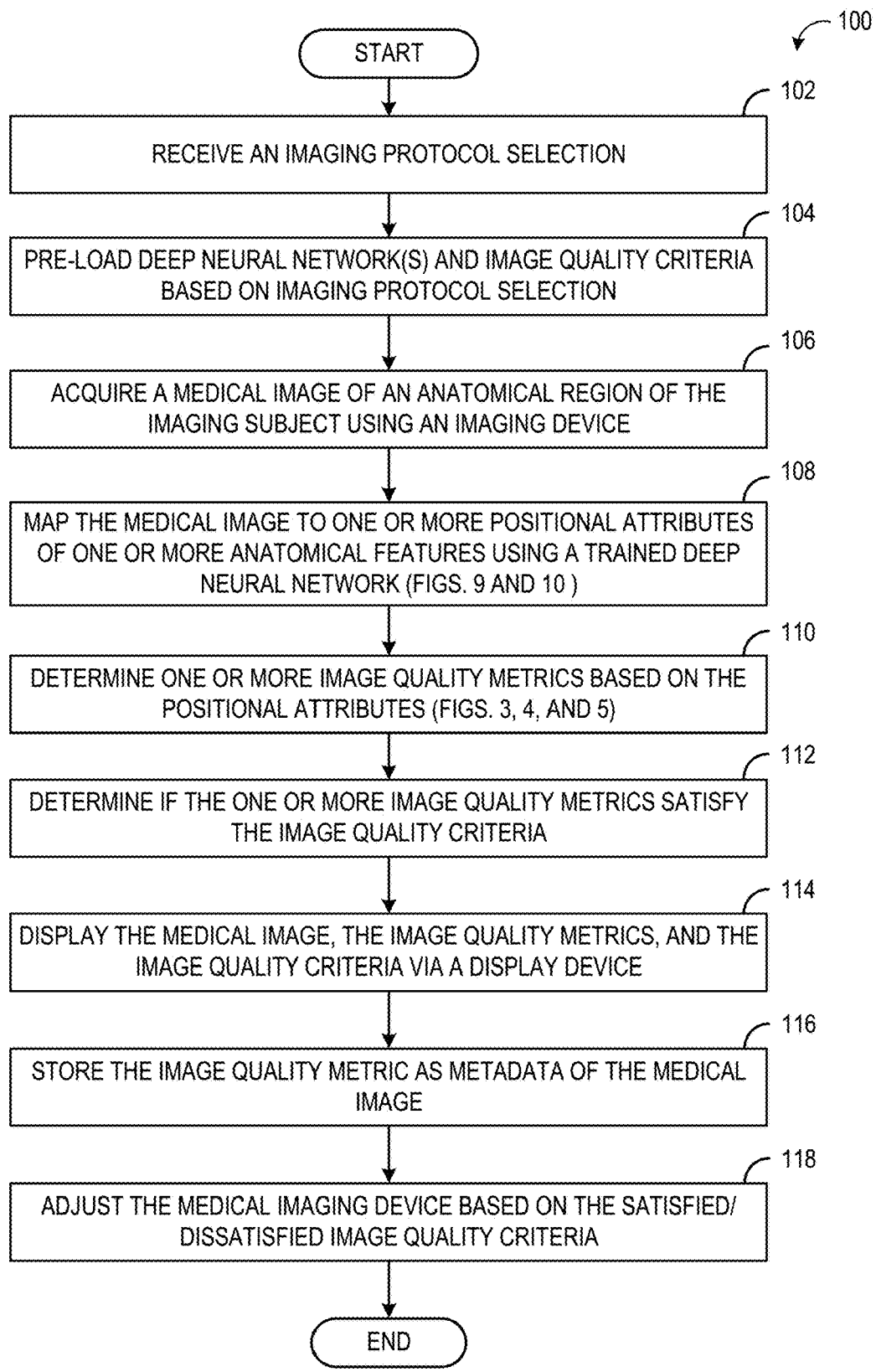
FIG. 1 shows an embodiment of a method for automatically assessing image quality criteria using a deep neural network.
Figure 2:
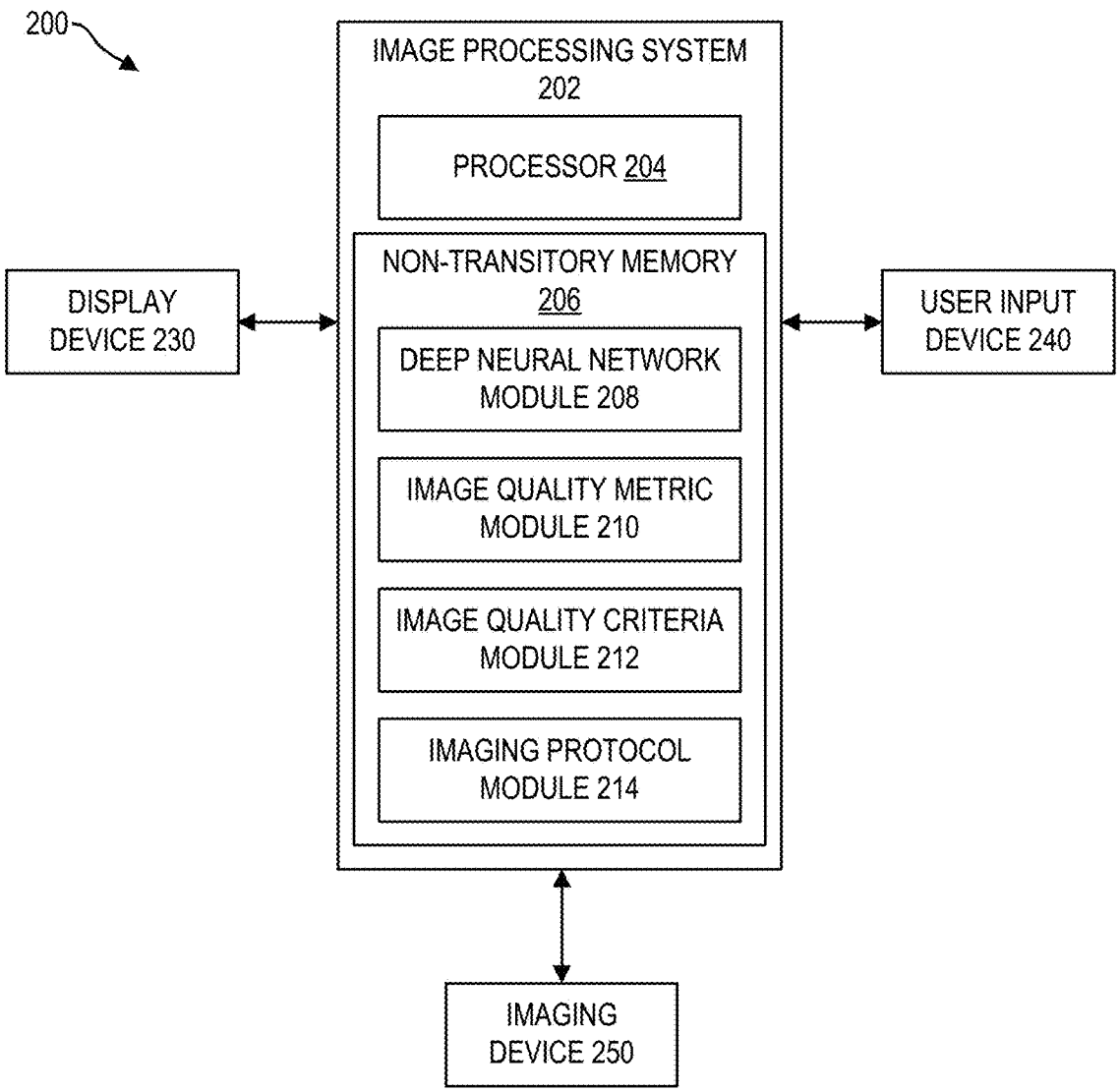
FIG. 2 shows an embodiment of a medical imaging system configured to automatically assess image quality criteria using deep neural networks.

In one embodiment, a medical imaging system 200, shown in FIG. 2, may automatically determine one or more image quality metrics, and use said image quality metrics to evaluate image quality criteria pertaining to a particular imaging protocol, by implementing method 100 shown in FIG. 1. Image quality metrics determined by method 100 may include, but are not limited to, a first image quality metric, a second image quality metric, and a third image quality metric, the determination of which is described in the discussion of method 300, shown in FIG. 3, method 400, shown in FIG. 4, and method 500, shown in FIG. 5, respectively. The first image quality metric, the second image quality metric, and the third image quality metric, may be graphically presented to a technician/radiologist or other user, via the graphical user interface (GUI) 600 shown in FIG. 6, the GUI 700, shown in FIG. 7, and the GUI 800, shown in FIG. 8, respectively. Exemplary deep neural network architecture 900 and multi-tasking neural network 1000, shown in FIGS. 9 and 10, respectively, may be used by medical imaging system 200, to infer positional attributes of one or more anatomical features, such as during execution of method 100.

Turning to FIG. 1, an embodiment is shown of a method 100 for automatically determining one or more image quality metrics, and assessing image quality criteria based on the image quality metrics. Method 100 may be executed by an imaging system, such as imaging system 200 discussed below with reference to FIG. 2.

At operation 102, the medical imaging system receives an imaging protocol selection, wherein the imaging protocol selection uniquely identifies a type of diagnostic medical image to be acquired. In some embodiments, the medical imaging system may automatically suggest an imaging protocol based on one or more features, such as camera images obtained of an imaging subject prior to diagnostic imaging. The suggested imaging protocol may be approved by a user, and said approval may constitute an imaging protocol selection. In some embodiments, the imaging protocol selection may indicate one or more acquisition parameters to be applied during acquisition of a medical image. In some embodiments, the imaging protocol selection includes, or is linked with, one or more imaging quality criteria, as well as locations in memory of one or more deep neural networks and instructions for determining an image quality metric from one or more positional attributes inferred by said one or more deep neural networks. The imaging protocol selection may be input by a user, such as a technician or radiologist, via a user input device of the medical imaging system.

At operation 104, the medical imaging system pre-loads the deep neural network(s) and image quality criteria included or linked with the imaging protocol selection. In some embodiments, the imaging protocol selection includes locations in memory of one or more deep neural networks associated with the imaging protocol selection, and at operation 104 the medical imaging system may retrieve and load into active memory, said one or more deep neural networks from the locations in memory. By pre-loading the deep neural networks into active memory of the medical imaging system, prior to acquisition of a medical image (at operation 106), a latency of the automatic determination of the image quality metrics may be reduced. Commonly radiologists may want an imaging subject positioned consistently for subsequent imaging, so the radiologist can assess variations caused by disease progression/improvement, and not changes caused by variation in image quality or imaging subject position. Therefore, in some embodiments, if an imaging subject has previously been imaged using a particular imaging protocol, the imaging protocol selection may include a unique patient/imaging subject identifier, such as an alpha numeric ID number. In such embodiments, the image quality criteria may be based on prior images acquired for the imaging subject/patient indicted by the identifier. In one example, assuming a prior image acquired using a particular imaging protocol for an imaging subject satisfied the image quality criteria associated with the imaging protocol, at operation 104 the medical imaging system may load a patient specific image quality criteria based on the prior image. In one example, the image quality criteria may comprise a match score threshold, wherein a currently acquired medical image may dissatisfy the image quality criteria if a match score, determined based on an extent of deviation between the currently acquired image and the previously acquired image, is less than the match score threshold.

At operation 106, the medical imaging system acquires a medical image of an anatomical region using a medical imaging device. In some embodiments, operation 106 includes the medical imaging device setting one or more acquisition parameters of the imaging device based on the imaging protocol selection. Acquisition parameters may include orientation of a radiation source, dose timing/amount, receiver gain, and other medical image acquisition settings known in the art. The medical imaging system may apply the acquisition parameters, scan an anatomical region of an imaging subject/patient to acquire imaging data, and perform various image reconstruction procedures on the imaging data to produce a medical image. The image acquired at operation 106 may be a two-dimensional (2D) or three-dimensional (3D) image. The imaging modality used to acquire the medical image at operation 106 may comprise, but is not limited to, x-ray imaging, computed tomography (CT), magnetic resonance imaging (MRI), and positron emission tomography (PET).

At operation 108, the medical imaging system maps the medical image to one or more positional attributes of one or more anatomical features using a trained deep neural network. The medical imaging system may feed the medical image acquired at operation 106 into an input layer of the one or more deep neural networks loaded into active memory at operation 104, wherein the deep neural network(s) may extract and/or encode features from the medical image, and map said features to one or more positional attributes of one or more anatomical features, as discussed in more detail in the description of FIGS. 9 and 10. In some embodiments, positional attributes include one or more of a location of an anatomical feature in the medical image, a segmentation mask of one or more anatomical features, an area or volume of the medical image occupied by an anatomical feature, an orientation of an anatomical feature (e.g., a direction of extent of one or more pre-determined axes of an anatomical feature relative to a coordinate system of the medical image), a length of an anatomical feature, a width of an anatomical feature, a breadth of an anatomical feature, and a classification score of an anatomical feature, wherein the classification score indicates a probability or binary (yes or no) assessment of if an anatomical feature is present in a field of view of the medical image.

Figure 3:
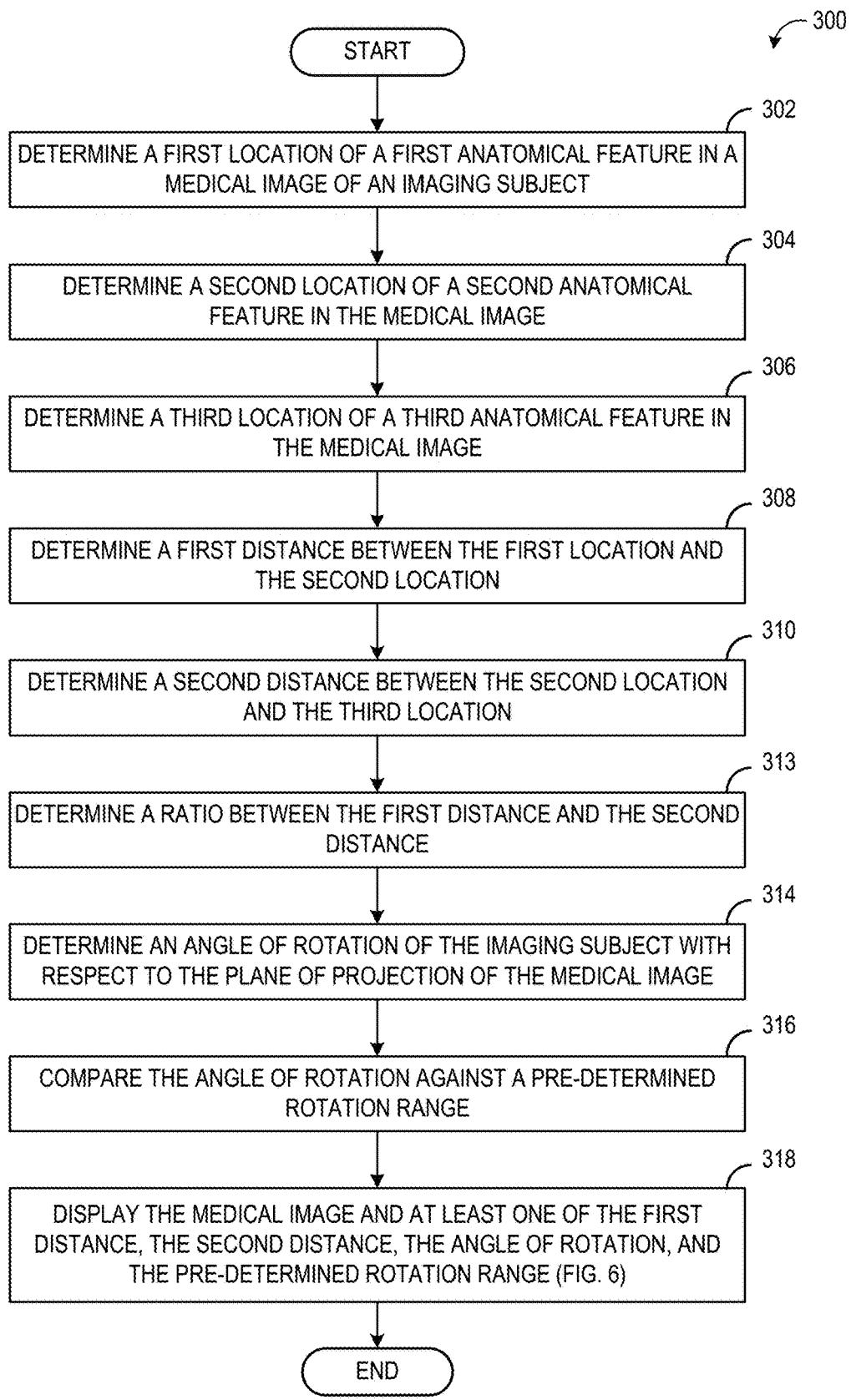
FIG. 3 shows an embodiment of a method for determining a first image quality metric which may be used to assess an image quality criterion.
Figure 4:
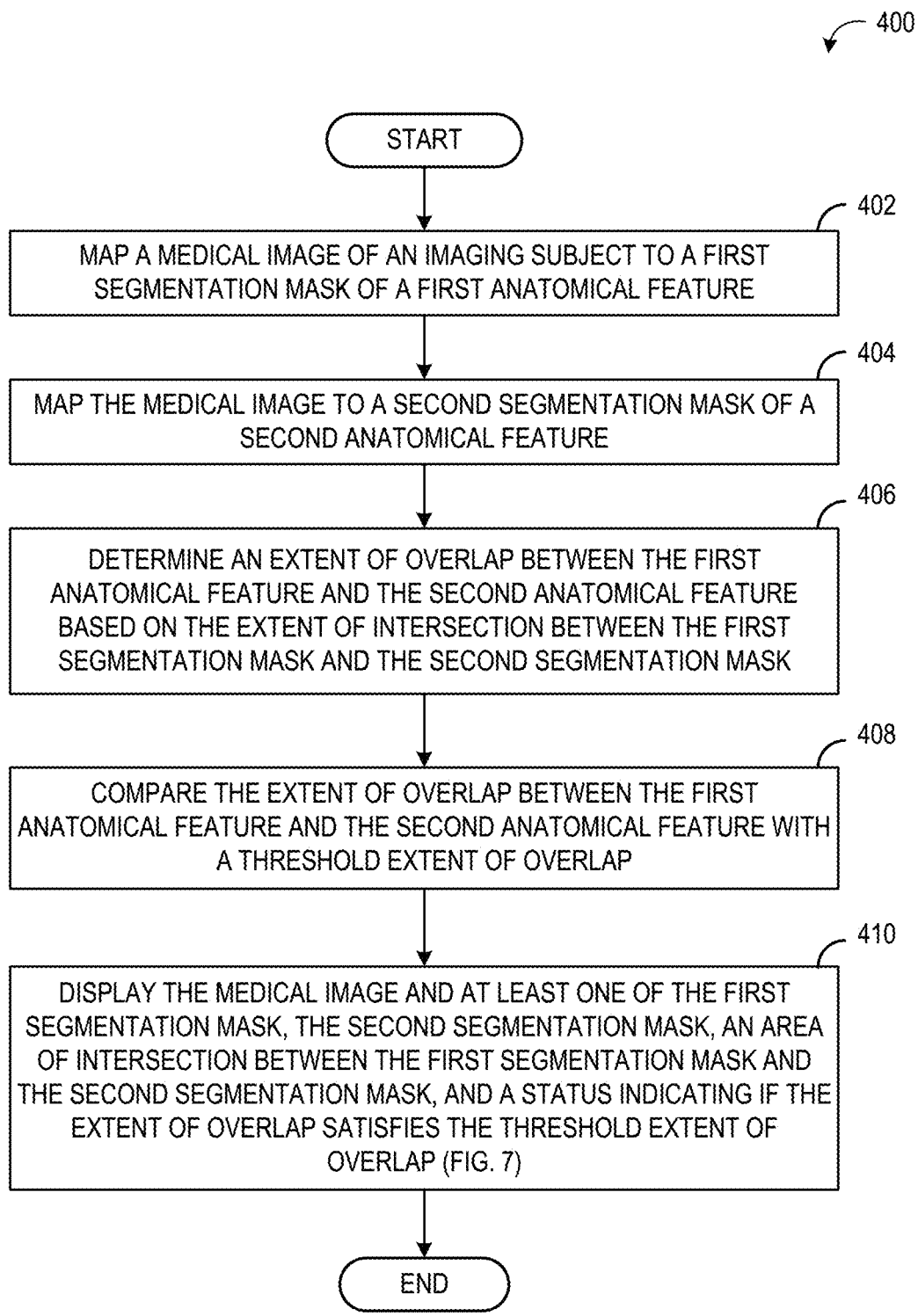
FIG. 4 shows an embodiment of a method for determining a second image quality metric which may be used to assess an image quality criterion.
Figure 5:
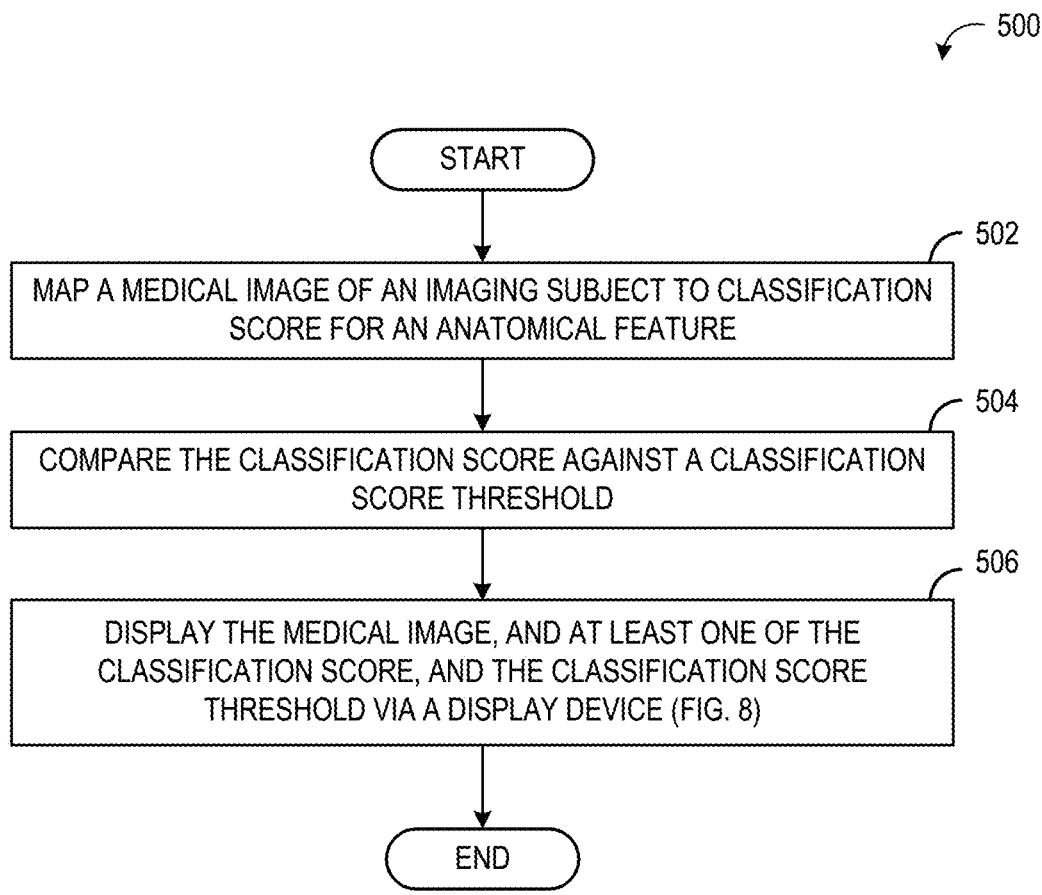
FIG. 5 shows an embodiment of a method for determining a third image quality metric which may be used to assess an image quality criterion.

At operation 110, the medical imaging system determines one or more image quality metrics based on the positional attributes determined at operation 108. Methods 300, 400, and 500, discussed below with reference to FIGS. 3, 4, and 5, respectively, discuss in more detail three exemplary embodiments of three distinct classes of image quality metrics, and methods for determining said image quality metrics from positional attributes. It will be appreciated that the image quality metrics, and associated methods of determination, discussed in FIGS. 3, 4, and 5, are given as exemplary embodiments, and are not to be construed as limiting the current disclosure. In some embodiments, image quality metrics include, a costophrenic angle, a cardiothoracic ratio, a mediastinal width, an angle of rotation of an imaging subject with respect to a projection plane of the medical image, an angle of rotation of an imaging subject with respect to a plane perpendicular to the projection plane of a medical image, and an extent of inspiration of lungs of the imaging subject.

At operation 112, the medical imaging system determines if the one or more image quality metrics satisfy the corresponding image quality criteria. An image quality criterion may comprise a value, or range of values, wherein an image quality metric is said to satisfy the corresponding image quality criterion if the image quality metric equals the value, or falls within the range of values, indicated by the image quality criterion. Likewise, an image quality metric not equaling the value, or not falling within the range of values, is said to not satisfy (or dissatisfy) the image quality criterion. As discussed above with reference to operation 104, the medical imaging system may retrieve the image quality criteria based on the imaging protocol selection. In some embodiments, the imaging protocol selection links or points to, a location in memory of the medical imaging system where the image quality criteria associated with the imaging protocol selection are stored. In some embodiments, image quality criteria of distinct imaging protocols may be associated with different values, or ranges of values, even when said value or ranges of values are associated with a same image quality metric. As an example, a first imaging protocol, indicated by an imaging protocol selection received by the medical imaging system, may indicate a first pre-determined range of rotation angles for an imaging subject, whereas a second imaging protocol may indicate a second, distinct (that is, non-equivalent) range of rotation angles.

At operation 114, the medical imaging system displays the medical image, the image quality metrics, and the image quality criteria via a display device. Exemplary embodiments of GUIs which may be displayed at operation 114 are shown in FIGS. 6, 7A, 7B, and 8. In some embodiments, the medical imaging system may highlight the one or more anatomical features of the medical image for which positional attributes were determined at operation 108. In some embodiments, the medical imaging system may display the medical image, and the image quality metric, but not the image quality criteria. In some embodiments, the medical imaging system may display a status of the image quality criteria, wherein the status indicates if the currently displayed medical image satisfies the image quality criteria, based on the image quality metric. In some embodiments, the medical imaging system may display an image quality metric proximal to the one or more anatomical features used in the determination of said image quality metric. In embodiments where the image quality metric is an angle formed by one or more anatomical features, the medical imaging system may display a numerical value of the angle, as well as a visual indication of the angle, at a location corresponding to said angle. The medical imaging system may display the medical image along with one or more of the image quality metric, and status of one or more image quality criteria, in substantially real time following image acquisition at operation 106, which may be facilitated by operation 104, wherein the relevant deep neural network(s) and image quality metrics are pre-loaded, prior to acquisition of the medical image.

At operation 116, the medical imaging system stores the image quality metric as metadata of the medical image. In some embodiments, the image quality metric, along with the statuses of the one or more image quality criteria, may be stored as metadata, or otherwise linked, to the medical image. In some embodiments, the image quality metric may be stored in the DICOM header of a medical image. In this way, later analysis of the medical image, such as by a radiologist, may be further facilitated by ease of access to image quality metric data.

At operation 118, the medical imaging system adjusts the medical imaging device based on the satisfied/dissatisfied image quality criteria. In one example, the medical imaging system may automatically reposition the imaging device relative to an imaging subject based on the image quality criteria, such as by moving the imaging device up, down, left, right, or altering an angle with respect to the imaging subject, to account for positioning errors of the imaging subject indicated by the image quality criteria. In another example, the medical imaging system may adjust one or more imaging parameters, such as an intensity of radiation used during image acquisition, a gain of a receiver, or other imaging parameters which may compensate for a dissatisfied image quality criteria. In one example, at operation 118, the medical imaging system may display a suggestion to a user via a display device to reposition an imaging subject based upon the satisfied/dissatisfied image quality criteria. In one example, the medical imaging system may display a suggestion for an imaging subject to change a degree of rotation with respect to an imaging device. In some examples, at operation 118, in response to a dissatisfied image quality criteria indicating a field of view is too large, the medical imaging system may adjust the imaging device by decreasing the collimation area by actuating collimation blades of the imaging device. In another example, in response to a dissatisfied image quality criteria indicating a field of view is too small, the medical imaging system may adjust the imaging device by increasing the collimation area by actuating collimation blades of the imaging device. Further, in some examples, in response to a dissatisfied image quality criteria, wherein the image quality criteria indicates a desired point in time during an inspiration/expiration cycle, or wherein the image quality criteria indicates motion induced blurring in a lung image, the imaging system may display via a display device a suggestion for the imaging subject to hold their breath (either at a state of inspiration or expiration based on the imaging protocol being employed). In some examples, operation 118 may include the medical imaging system changing the mA's of the imaging device to achieve more penetration, higher dose. In some examples, operation 118 may include the medical imaging system activating AutoGrid (a software processing to remove scatter). In some examples, operation 118 may include the medical imaging system adjusting SID (to avoid anatomical cut off if the collimator blades are open). In some examples, operation 118 may include the medical imaging system adjusting collimator blades (shrinking if there is a lot of air around the anatomy, or expanding if the region of interest is cut off). In some examples, operation 118 may include the medical imaging system turning on grid line reduction (if grid lines are detected). In some examples, operation 118 may include the medical imaging system conducting a second image processing called Quick Enhance. In some examples, operation 118 may include the medical imaging system moving an OTS tube up/down, left/right if the patient has angulation or rotation respectively, (moving the system around the patient, vs asking the patient to reposition). Following operation 118, method 100 may end.

In this way, method 100 enables automatic and rapid determination of one or more image quality metrics following acquisition of a medical image. In this way, a technician may receive quantitative information regarding one or more geometrical aspects of a medical image with little to no latency, facilitating the technician's evaluation of, and choice to accept or reject, the medical image. Further, by storing the image quality metric as metadata of the medical image, each stakeholder or evaluator may receive a consistent, quantitative, and precise measure of the image quality metrics pertaining to a particular image acquired via a particular imaging protocol.

Referring to FIG. 2, an imaging system 200 is shown, in accordance with an exemplary embodiment. In some embodiments, at least a portion of imaging system 200 is disposed at a remote device (e.g., edge device, server, etc.) communicably coupled to imaging system 200 via wired and/or wireless connections. In some embodiments, at least a portion of imaging system 200 is disposed at a separate device (e.g., a workstation) which can receive images from the imaging system 200 or from a storage device which stores the images generated by one or more additional imaging systems. Imaging system 200 comprises image processing device 202, display device 230, user input device 240, and imaging device 250.

Image processing device 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store deep neural network module 208, image quality metric module 210, image quality criteria module 212, and imaging protocol module 214. Deep neural network module 208 may include one or more deep neural networks, comprising a plurality of weights and biases, activation functions, and instructions for implementing the one or more deep neural networks to receive medical images and map the medical images to one or more positional attributes of one or more anatomical features in the medical images. For example, deep neural network module 208 may store instructions for implementing a neural network, such as the exemplary deep neural networks shown in FIGS. 9 and 10. Deep neural network module 208 may include trained and/or untrained neural networks and may further include various metadata for the one or more trained or untrained deep neural networks stored therein. In some embodiments, deep neural networks may be stored in locations of non-transitory memory indexed according to a value or key, wherein the value or key indicates one or more imaging protocols in which the deep neural networks may be employed.

Non-transitory memory 206 may further include image quality metric module 210, which comprises instructions for determining one or more image quality metrics based on at least a first positional attribute of an anatomical feature. Image quality metric module 210 may include instructions that, when executed by processor 204, cause image processing device 202 to conduct one or more of the steps of methods 300, 400, and/or 500, discussed in more detail below with reference to FIGS. 3, 4, and 5, respectively. In one example, image quality metric module 210 includes instructions . . . . In some embodiments, the image quality metric module 210 is not disposed at the imaging device 200, but is located remotely and communicatively coupled to imaging system 200.

Non-transitory memory 206 may further store image quality criteria module 212, wherein a plurality of image quality criteria, associated with one or more imaging protocols may be stored.

In some embodiments, the non-transitory memory 206 may include components disposed at two or more devices, which may be remotely located and/or configured for coordinated processing. In some embodiments, one or more aspects of the non-transitory memory 206 may include remotely-accessible networked storage devices configured in a cloud computing configuration.

Imaging system 200 may further include user input device 240. User input device 240 may comprise one or more of a touchscreen, a keyboard, a mouse, a trackpad, a motion sensing camera, or other device configured to enable a user to interact with and manipulate data within image processing device 202. In one example, user input device 240 may enable a user to annotate an object class of interest in a 3D medical image.

Display device 230 may include one or more display devices utilizing virtually any type of technology. Display device 230 may be combined with processor 204, non-transitory memory 206, and/or user input device 240 in a shared enclosure, or may be peripheral display device and may comprise a monitor, touchscreen, projector, or other display device known in the art, which may enable a user to view 2D medical images, 3D medical images, pseudo-3D medical images, and thickness heat-maps, and/or interact with various data stored in non-transitory memory 206.

Imaging system 200 further includes imaging device 250. Imaging device 250 may comprise a 2D or 3D medical imaging device, including but not limited to an x-ray imaging device, a CT imaging device, an MRI system, an ultrasound, and a PET imaging device. Images acquired by imaging device 250 may be stored at image data 212 in non-transitory memory 206, or may be stored remotely at an external storage device communicatively coupled to imaging system 200.

It should be understood that image processing system 200 shown in FIG. 2 is for illustration, not for limitation. Another appropriate image processing system may include more, fewer, or different components.

Turning to FIG. 3, an embodiment of a method 300 for automatically determining a first class of image quality metrics, which may be used to assess an image quality criterion, is shown. Method 300 may be executed by a medical imaging system, such as medical imaging system 200, by executing machine readable instructions stored in non-transitory memory. In some embodiments, instructions for executing one or more operations of method 300 may be stored in an image quality metric module, such as image quality metric module 212 shown in FIG. 2. One or more of the operations of method 300 may be executed by a medical imaging system as part of another method. In some embodiments, one or more of the operations of method 300 may be executed as part of method 100, discussed above.

At operation 302, the medical imaging system determines a first location of a first anatomical feature in a medical image of an imaging subject. The first location is a positional attribute of the first anatomical feature, which may be determined by a trained deep neural network. In some embodiments, the medical imaging system may determine the first location of the first anatomical feature by feeding the medical image into a trained deep neural network, wherein the deep neural network maps the input medical image to coordinates of the first location using a plurality of learned parameters. In some embodiments, the medical imaging system feeds the medical image to a trained deep neural network configured to map the medical image to a segmentation mask of the first anatomical feature, and the first location of the first anatomical feature is determined based on the segmentation mask. In some embodiments, the first location may be determined from a segmentation mask by calculating a center-point of the segmentation mask. In some embodiments, the first location of the first anatomical feature may be determined via an additional trained deep neural network, configured to determine for a particular anatomical feature's segmentation mask, a pre-determined position or anatomical landmark of said anatomical feature. As an example, a deep neural network may be configured to determine a location of a pupil from a segmentation mask of eyes, wherein eyes are the first anatomical feature in the present example, and wherein the center of the pupil is the first location. In some embodiments, the first location may be determined from a segmentation mask of the first anatomical feature by fitting a bounding box (or other shape), to the point cloud of the segmentation mask, wherein the first location is given at a fixed position relative to the bounding box (e.g., the first position is a function of the bounding box's position), thereby fitting of the bounding box to the segmentation mask implicitly identifies the first location. It will be appreciated that operation 302, as well as the other operations of method 300, may be applied to 2D or 3D images.

At operation 304, the medical imaging system determines a second location of a second anatomical feature in the medical image. The medical imaging system may determine the second location of the second anatomical feature in a manner analogous to that described above, with reference to operation 302. In some embodiments, a same trained deep neural network may be used to perform the determination of the first location and the second location. In some embodiments, a multi-tasking deep neural network, such as multi-tasking deep neural network 1000, may be employed at operations 302 and 304 to determine the first location and the second location, wherein the first location may be determined via a first branch of the multi-tasking deep neural network, and wherein the second location may be determined via a second branch of the multi-tasking deep neural network. Particularly, if the first anatomical feature and the second anatomical feature belong to a same anatomical class (e.g., teeth, phalanges, etc.), or represent anatomical features related by symmetry (e.g., a left hand and a right hand). In some embodiments, both the first location and the second location may be determined from a single segmentation mask, by natural extension of the approaches discussed above at operation 302 with regards to segmentation masks and determination of a single location, to the case of two locations.

At operation 306, the medical imaging system determines a third location of a third anatomical feature in the medical image. The medical imaging system may determine the third location of the third anatomical feature in a manner analogous to that described above, with reference to operations 302, and 304. In some embodiments, distinct trained deep neural networks may be employed to determine the first location, the second location and the third location. In some embodiments, a single trained deep neural network may be used to determine two or more of the first location, the second location, and the third location. In some embodiments, two or more of the first location, the second location, and the third location, may be determined from a single segmentation mask produced by a single trained deep neural network.

At operation 308, the medical imaging system determines a first distance between the first location and the second location. In some embodiments, the first location and second location comprise points in 2D or 3D space, uniquely identified by two coordinates, or three coordinates (in the case of 2D and 3D respectively), and the first distance may be determined by calculating the Euclidean distance between coordinates of the first location and the second location. In some embodiments, operation 308 may include determination of a vector connecting the first location and second location, thereby providing a relative displacement of the first location with respect to the second location. In some embodiments, the distance may be measured in pixels and/or voxels. In some embodiments, a distance may be determined in physical units, such as feet or meters.

At operation 310, the medical imaging system determines a second distance between the second location and the third location. The medical imaging system may determine the second location in a manner analogous to that described above, with respect to the first distance determined at operation 308.

At operation 312, the medical imaging system determines a ratio between the first distance and the second distance.

At operation 314, the medical imaging system determines an angle of rotation of the imaging subject with respect to the plane of projection of the medical image. In some embodiments, a difference between the first distance and the second distance may be proportional to an angle of rotation of the imaging subject with respect to the projection plan of the medical image, such as when the first anatomical feature and the third anatomical feature are symmetrical anatomical features (e.g., left and right hands, left and right clavicles, etc.). In some embodiments, one or more trigonometric relationships between the first anatomical feature, the second anatomical feature, and the third anatomical feature, may be used in conjunction with the first distance and the second distance to determine the angle of rotation. In some embodiments, a computational complexity of method 300 may be reduced by expressing an image quality criterion for an angle of rotation in terms of a range of relative first distances and second distances, thus enabling direct comparison between a ratio or difference of the currently measured first distance and second distance, against a threshold range of distance ratios (or differences) corresponding to the desire angular range. This may reduce the need for additional calculations converting the first and second distance into an angle of rotation at the time of image acquisition.

At operation 316, the medical imaging system compares the angle of rotation against a pre-determined rotation range. The medical imaging system may access a value, or range of values, corresponding to the desired angular range, and may determine if the angle (or values) determined at operation 314 fall with, or satisfy, the value or values. In some embodiments, an image quality criterion may comprise a threshold range of rotation of an imaging subject with respect to a projection plane of a medical image, wherein the image quality metric may comprise a currently determined angle, and the image quality criterion may comprise a pre-determined threshold degree of rotation, or an upper and lower angular threshold, wherein if the currently determined angle of rotation exceeds the upper angular threshold, or is less than the lower angular threshold, the medical imaging system responds by setting a status of the image quality criteria to a value indicating the image quality metric of the medical image does not satisfy the image quality criterion. Conversely, if the image quality metric determined at operation 314 satisfies the pre-determined rotation range, the medical imaging system responds by setting a status of the rotation image quality criterion to a value indicating the image quality metric satisfies the image quality criterion.

At operation 318, the medical imaging system displays the medical image and at least one of the first distance, the second distance, the angle of rotation, and the pre-determined rotation range. By displaying the image quality metric (the angle of rotation) along with the pre-determined rotation range, a technician or radiologist may quickly evaluate a quantitative comparison between the actual rotation angle of the medical image and a standard or desired range of rotation angles. Following operation 318, method 300 may end.

Figure 6:
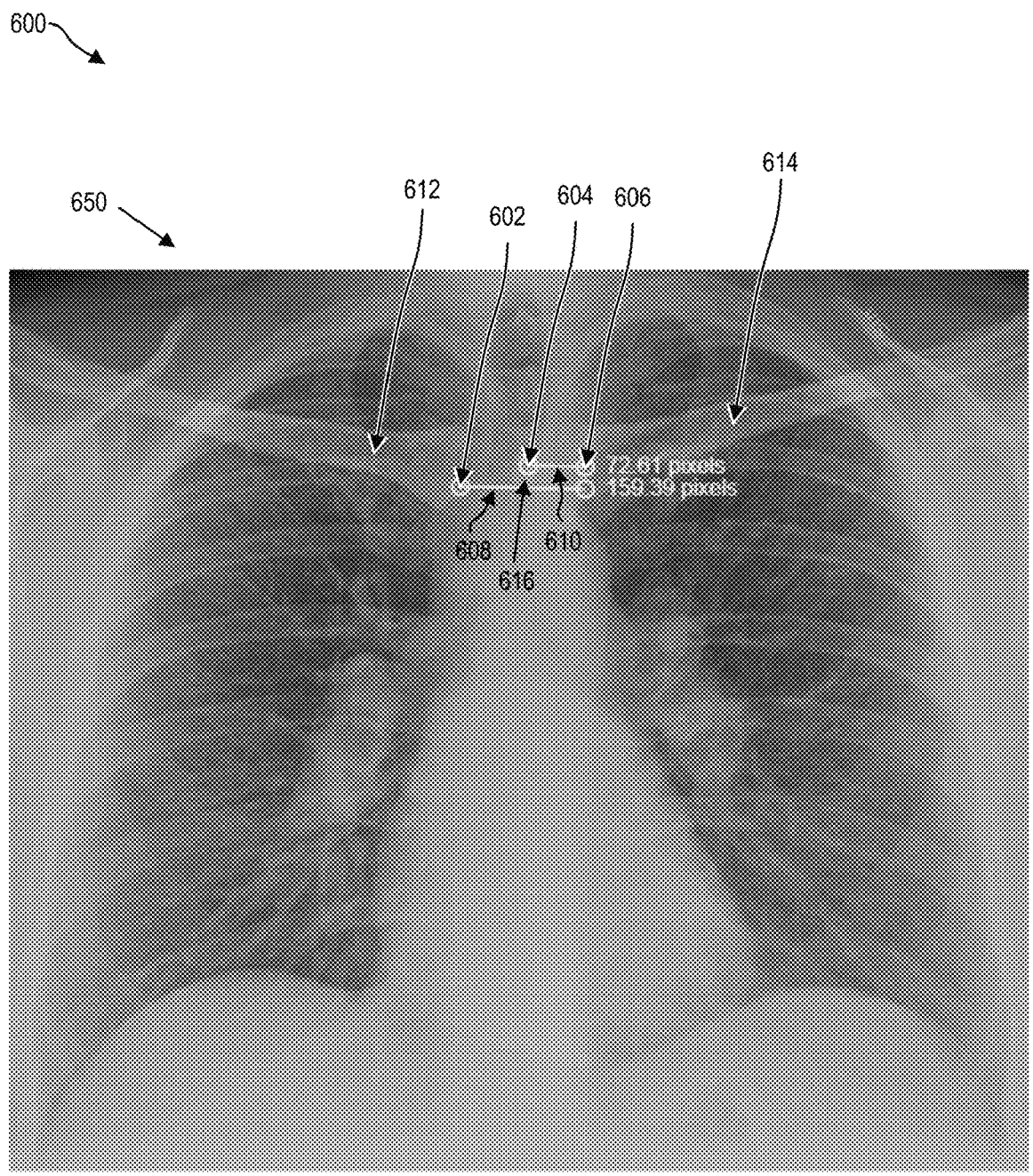
FIG. 6 shows an embodiment of a graphical user interface for displaying medical images and the first image quality metric.

Turning briefly to FIG. 6, an exemplary embodiment of a GUI 600, which may be displayed as part of an automated image quality assessment, such as at operation 318 of method 300, is shown. GUI 600 includes a medical image 650, comprising a chest x-ray of an imaging subject. Superimposed on medical image 650 is a first distance 608, between a first location 602, located on a first anatomical feature 612 (a right clavicle) and a second location 606, of a second anatomical feature 614 (a left clavicle of the imaging subject). Further GUI 600 shows a second distance 610, between the second location 606 and the third location 604, located on a third anatomical feature 616 (the spinous process). Numerical values for both the first distance 608, and the second distance 610, are shown superimposed on medical image 650, proximal to the first distance 608 and second distance 610. Units of the first distance 608 and the second distance 610 are in pixels. Further, the first anatomical feature 612, the second anatomical feature 614, and the third anatomical feature 616, are shown in highlight, emphasizing the accuracy of the segmentation masks of the first, second, and third anatomical features, respectively. Thus, GUI 600 provides quantitative image quality metrics at a glance, as well as indications of the positional attributes of the anatomical features upon from which the image quality metric was determined. By providing this quantitative information for an image quality metric, GUI 600 enables a technician or radiologist to more quickly, accurately, and consistently, evaluate geometrical aspects of a medical image, which may otherwise be difficult, slow, or impossible, to ascertain by eye.

Turning to FIG. 4, an embodiment of a method 400 for automatically determining a second class of image quality metric, which may be used to assess an image quality criterion, is shown. Method 400 may be executed by a medical imaging system, such as medical imaging system 200, by executing machine readable instructions stored in non-transitory memory. In some embodiments, instructions for executing one or more operations of method 400 may be stored in an image quality metric module, such as image quality metric module 212 shown in FIG. 2. One or more of the operations of method 400 may be executed by a medical imaging system as part of another method. In some embodiments, one or more of the operations of method 400 may be executed as part of method 100, discussed above.

At operation 402, the medical imaging system maps a medical image of an imaging subject to a first segmentation mask of a first anatomical feature. In some embodiments, the segmentation mask may comprise a 2D segmentation mask, or 3D segmentation mask. The medical imaging system may access a pre-loaded deep neural network, wherein said deep neural network is trained to predict segmentation masks for the first anatomical feature. An exemplary approach for mapping a medical image to a segmentation mask is given by deep neural network architecture 900, discussed below in the description of FIG. 9. Briefly, segmentation masks may comprise an array or matrix of values, corresponding to the array or matrix of pixel/voxel intensity values of an input image. Each value may be associated with a region of the medical image corresponding to a pixel or voxel. Values may be of one or more discrete and pre-determined numbers or IDs, uniquely matching to a set of anatomical class labels, indicating if the corresponding pixel or voxel has been classified as a member of said one or more classes.

At operation 404, the medical imaging system maps the medical image to a second segmentation mask of a second anatomical feature. The medical imaging system may map the medical image to the second segmentation mask in a manner substantially analogous to that described above, with respect to operation 402. In some embodiments, a same trained deep neural network may be used to perform the determination of the first segmentation mask and the second segmentation mask. In some embodiments, a multi-tasking deep neural network, such as multi-tasking deep neural network 1000, may be employed at operations 402 and 404 to determine the first segmentation mask and the second segmentation mask, wherein the first segmentation mask may be determined via a first branch of the multi-tasking deep neural network, and wherein the second segmentation mask may be determined via a second branch of the multi-tasking deep neural network. Particularly, if the first anatomical feature and the second anatomical feature belong to a same anatomical class (e.g., teeth, phalanges, etc.), or represent anatomical features related by symmetry (e.g., a left hand and a right hand), a multi-tasking deep neural network may be particularly advantageous, as a shared encoded feature map may be used in determination of both the first segmentation mask and the second segmentation mask. In some embodiments, both the first segmentation mask and the second segmentation mask may be determined from a single deep neural network, wherein the deep neural network is not a multi-tasking deep neural network. In some embodiments, the first segmentation mask may be produced by a first deep neural network, and the second segmentation mask may be produced by a second deep neural network, wherein the first deep neural network is distinct and shares no layers or parameters with the first deep neural network.

At operation 406, the medical imaging system determines an extent of overlap between the first anatomical feature and the second anatomical feature based on the extent of intersection between the first segmentation mask and the second segmentation mask. In some embodiments, both the first and second segmentation masks occur in a same coordinate system, wherein a first point or pixel from a medical image may correspond to a second point in the first segmentation mask, and a third point in the second segmentation mask, wherein the second point and the third point occur at a same coordinate address in their respective segmentation masks. In other words, a point at (1,1) in a first segmentation mask corresponds to a point at (1,1) in the second segmentation mask. Thus, the medical imaging system may determine the intersection/overlap of the first feature with the second feature, based on the number of points in the first segmentation mask classified as belonging to the first anatomical feature, which have matching points (that is, points occurring at the same coordinate address) in the second segmentation mask classified as belonging to the second anatomical feature. Thus, the area (or volume) of intersection between the first anatomical feature and the second anatomical feature may be determined by multiplying said number of matching points between the first segmentation mask and the second segmentation mask by a proportionality constant, giving the spatial area (or volume) occupied by each pixel or voxel in the medical image.

At operation 408, the medical imaging system compares the extent of overlap between the first anatomical feature and the second anatomical feature with a threshold extent of overlap. The medical imaging system may access a value, or range of values, indicating a desired extent of overlap, wherein said value or values may be indexed according to imaging protocol, thereby enabling rapid access to the value or values in response to receiving an imaging protocol selection. In some embodiments, the value or values may be stored in units of overlapping segmentation mask points, as opposed to spatial extents of overlap, thus reducing the computational expense of converting intersecting points to a spatial area or volume. In some embodiments, the threshold extent of overlap comprises a value, indicating an upper, or a lower, limit of desired overlap. As an example, an upper threshold extent of overlap may be set to 400 cm$^2$, and medical images including an extent of overlap of greater than 400 cm$^2$, are considered as not satisfying or meeting the image quality criteria of 400 cm$^2$, whereas medical images having an extent of overlap less than 400 cm$^2$ are considered as satisfying the image quality criteria.

At operation 410, the medical imaging system displays the medical image and at least one of the first segmentation mask, the second segmentation mask, an area of intersection between the first segmentation mask and the second segmentation mask, and a status indicating if the extent of overlap satisfies the threshold extent of overlap. Following operation 410, method 400 may end. In this way, method 400 enables a technician or radiologist to quickly determine if a first anatomical feature is occluding a second anatomical feature, in a medical image. This may enable a technician to quickly determine that greater than a desired extent of overlap or occlusion is present in a medical image, in cases where such occlusion is undesired. Conversely, in some imaging protocols, alignment between a first anatomical feature and a second anatomical feature may be desired. In such cases, method 400 enables a technician or radiologist to quickly determine if a desired extent of overlap is achieved.

Figure 7:
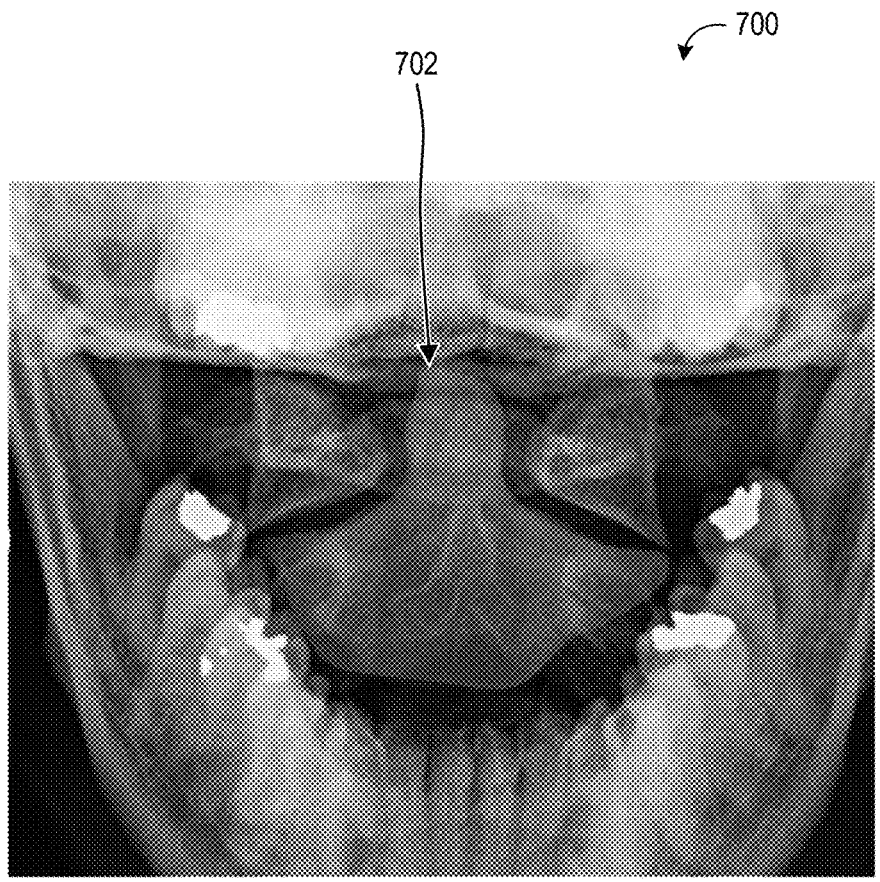
FIG. 7 embodiments of a graphical user interface for displaying medical images and the second image quality metric.

Turning to FIG. 7, a graphical user interface 700, which may be displayed as part of an automated image quality assessment, such as at operation 410 of method 400, is shown. User interface 700 shows segmentation map 702, indicating the automatically inferred region occupied by the C1 vertebrate of the imaging subject. As can be the seen, the outline of the C1 vertebrae as determined by the segmentation map 702 is fully visible, that is, does not overlap with the teeth of the imaging subject. By showing a segmentation map, or heat map, of the position of an anatomical feature of interest, a radiologist or imaging technician may be enabled to quickly assess if the anatomy of interest is clipped or blocked. In some embodiments, a quantitative image quality metric, such as a visibility score indicating an automatically inferred extent of clipping of an anatomical region of interest may be displayed in GUI 700, wherein an anatomical feature with no clipping or blockage may be given a high visibility score, and an anatomical region of interest with substantial blocking or clipping may be given a low visibility score. The visibility score may be superimposed on the medical image proximal to the segmentation map 702.

Turning to FIG. 5, an embodiment of a method 500 for automatically determining a second image quality metric, which may be used to assess an image quality criterion, is shown. Method 500 may be executed by a medical imaging system, such as medical imaging system 200, by executing machine readable instructions stored in non-transitory memory. In some embodiments, instructions for executing one or more operations of method 500 may be stored in an image quality metric module, such as image quality metric module 212 shown in FIG. 2. One or more of the operations of method 500 may be executed by a medical imaging system as part of another method. In some embodiments, one or more of the operations of method 500 may be executed as part of method 100, discussed above.

At operation 502, the medical imaging system maps a medical image of an imaging subject to a classification score for an anatomical feature. In some embodiments, the classification score may comprise a probability or confidence of the anatomical feature being present and observable within a field-of-view of the medical image. In some embodiments, the classification score may comprise a binary label, indicating either a presence or absence of the anatomical feature from the field-of-view of the medical image. Method 500 is described with reference to a single anatomical feature, however it will be appreciated that method 500 may be extended to a plurality of anatomical features, wherein an anatomical score for each of the plurality of anatomical features may be determined.

At operation 504, the medical imaging system compare the classification score against a classification score threshold. The classification score threshold may comprise a single value (in the case of a binary, true/false, classification score), or a range of values, in the case of a real valued classification score. In some embodiments, classification score threshold may be stored in locations of non-transitory memory associated with one or more imaging protocols, wherein, in response to receiving an imaging protocol selection, the medical imaging system may access the image quality criteria indicated by the imaging protocol selection.

At operation 506, the medical imaging system display the medical image, and at least one of the classification score, and the classification score threshold via a display device. Following operation 506, method 500 may end. Two exemplary embodiments of GUIs which may be displayed at operation 506 are shown in FIGS. 8A an 8B.

Figure 8A:
FIGS. 8A and 8B show an embodiments of a graphical interface for displaying medical images and the third image quality metric.
Figure 8B:
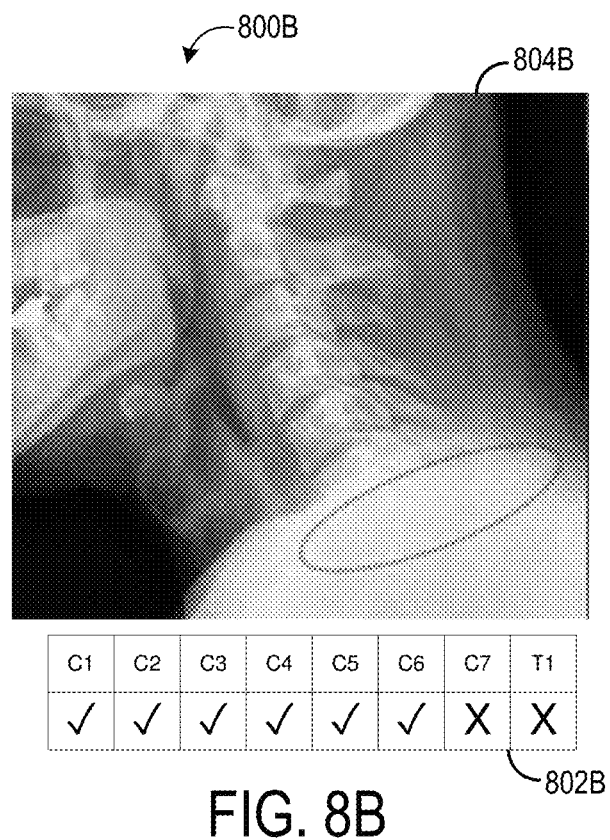

Turning to FIGS. 8A and 8B, GUI 800A and GUI 800B, which may be displayed as part of an automated image quality assessment, such as at operation 506 of method 500, are shown. GUI 800A includes a first medical image 804A, showing a view of the cervical vertebra of an imaging subject. GUI 800A further includes a table 802A, showing a plurality of classification scores for a plurality of anatomical features. In particular, table 802A includes a first row, indicating each of a plurality of anatomical features, from the C1 vertebra to the T1 vertebra. Below each anatomical feature label in table 802A, is a status of an image quality criteria assessment, wherein anatomical features with classification scores above a corresponding classification score threshold, are indicated via a check mark, whereas anatomical features with classification scores below a corresponding classification score threshold are indicated with an X. As can be seen in FIG. 8A, the first medical image 804A has satisfied each of the classification score image quality criteria, as each of C1-T1 are visible in the field-of-view of first medical image 804A. Conversely, in FIG. 8B, table 802B indicates the classification thresholds are satisfied for anatomical features C1-C6, but are not satisfied for anatomical features C7 and T1. In other words, second medical image 804B has a low probability of the C7-T1 vertebra being visible in the field-of-view.

Figure 9:
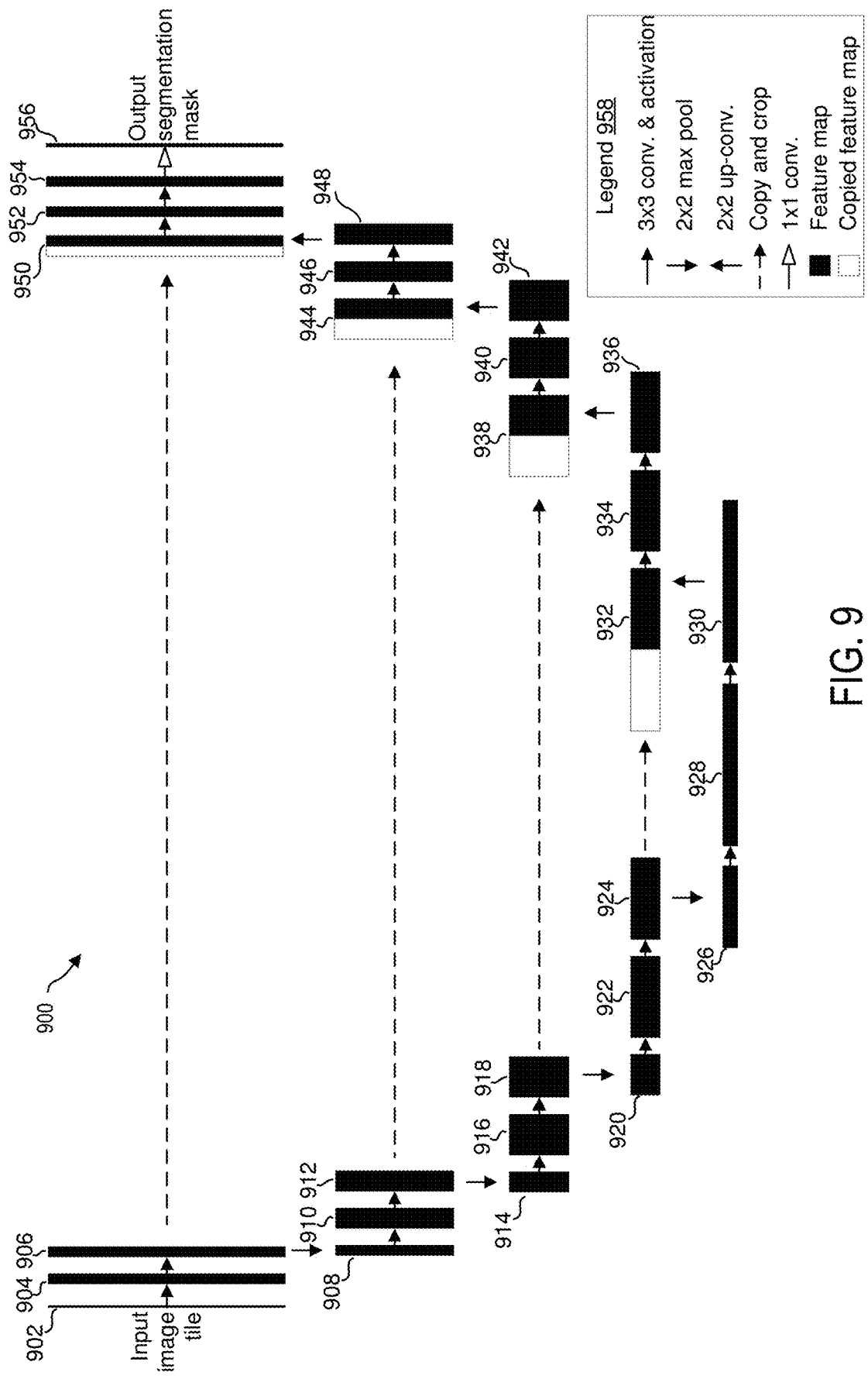
FIG. 9 shows a first embodiment of a deep neural network configured to map medical images to a positional attribute an anatomical feature.

Turning to FIG. 9, a deep neural network architecture 900 for mapping medical images to positional attributes of an anatomical feature of interest is shown, in accordance with an exemplary embodiment. In particular, deep neural network architecture 900 is a convolutional neural network (CNN) architecture, configured to map medical images to segmentation masks for one or more anatomical features of interest. Deep neural network architecture 900 is configured to receive an image tile, comprising pixel/voxel intensity values in one or more color channels, extract and embed features from the input image tile, and map said encoded features to a segmentation mask. From the segmentation mask, information regarding a size, location, orientation, or other positional attribute of the anatomical features may be determined. Deep neural network architecture 900 includes a series of mappings, from an input image tile 902 which may be received by an input layer, through a plurality of feature maps, and finally to an output segmentation mask 956 which may be produced by an output layer. Although input into deep neural network architecture 900 is referred to herein as comprising pixel/voxel intensity tiles, it will be appreciated that additional or different features may be fed into deep neural networks disclosed herein. In one embodiment, additional features, such as patient/imaging subject specific information, may be concatenated with an input image tile and fed into deep neural network architecture 900.

The layers and operations/transformations comprising deep neural network architecture 900 are labeled in legend 958. As indicated by legend 958, deep neural network architecture 900 includes a plurality of feature maps, wherein each feature map may be produced by applying a transformation or mapping to one or more previous feature maps (or input data in the case of the input image tile 902). Each feature map may comprise a multi-dimensional matrix, or multi-dimensional array, of feature values, wherein each feature value may be uniquely identified by a set of $N_i$ indices, wherein $N_i$ is the number of dimensions in the $i^{th}$ feature map. The size of a feature map may be described using spatial dimensions. As an example, length, width, and depth, may be used to refer to the number of rows, columns, and channels, in a three-dimensional feature map. For feature maps of $N_i$ greater than three, terms such as hyper-width, hyper-depth, and hyper-length, may be used.

The transformations/mappings performed on each feature map are indicated by arrows, wherein each type of arrow corresponds to a unique transformation, as indicated by legend 958. Rightward pointing solid black arrows indicate 3×3 convolutions and activations, wherein a feature value for an $i^{th}$ feature map is determined by calculating a dot product between a 3×3×$j_{i-1}$ filter and a 3×3×$j_{i-1}$ group of feature values from the i-$1^{th}$ feature map, wherein $j_{i-1}$ is the number of feature channels of the i-$1^{th}$ feature map. The dot product is passed through a pre-determined activation function to determine the feature value for the $i^{th}$ feature map.

Downward pointing arrows indicate 2×2 max pooling, wherein the max value from a 2×2×1 group of feature values from an i-$1^{th}$ feature map is propagated to an $i^{th}$ feature map, thereby resulting in a 4-fold reduction in spatial resolution of the $i^{th}$ feature map compared to the i-$1^{th}$ feature map. In some embodiments, each feature channel is pooled separately, thus conserving the number of feature channels between the i and i-$1^{th}$ feature maps.

Upward pointing arrows indicate 2×2 up convolutions, wherein output from a single feature channel of an feature map is mapped to a 2×2 grid of feature values in an $i^{th}$ feature map, thereby resulting in a 4-fold increase in spatial resolution of the $i^{th}$ feature map compared to the i-$1^{th}$ feature map.

Rightward pointing dash-tailed arrows indicate copying and cropping an i-$m^{th}$ feature map and concatenating the copied feature map to an $i^{th}$ feature map, wherein m may be a function of i. Cropping enables the dimensions of the i-$m^{th}$ feature map (excluding the channel depth) to match the dimensions of the $i^{th}$ feature map. Cropping and concatenating increases the feature channel depth of the $i^{th}$ feature map.

Rightward pointing arrows with hollow heads indicate a 1×1×$j_{i-1}$ convolution and activation, wherein a dot product is determined between a 1×1×$j_{i-1}$ group of feature values of the i-$1^{th}$ feature map, and a 1×1×$j_{i-1}$ filter, wherein $j_{i-1}$ is the number of feature channels of the i-$1^{th}$ feature map. The dot product may be passed through an activation function to produce a feature value for the $i^{th}$ feature map. The 1×1 convolution and activation does not change the spatial resolution of the input feature map, as there is a 1-to-1 mapping between each spatially distinct feature in the input feature map and each spatially distinct feature in the output feature map.

In addition to the operations indicated by the arrows within legend 958, Deep neural network architecture 900 includes solid filled rectangles corresponding to feature maps, wherein feature maps comprise a height (top to bottom length as shown in FIG. 9, corresponds to a y spatial dimension in an x-y plane), width (not shown in FIG. 9, assumed equal in magnitude to height, corresponds to an x spatial dimension in an x-y plane), and depth (a left-right length as shown in FIG. 9, corresponds to the number of feature channels within each feature map). Likewise, Deep neural network architecture 900 includes hollow (unfilled) rectangles, corresponding to copied and cropped feature maps, wherein copied feature maps comprise height (top to bottom length as shown in FIG. 9, corresponds to a y spatial dimension in an x-y plane), width (not shown in FIG. 9, assumed equal in magnitude to height, corresponds to an x spatial dimension in an x-y plane), and depth (a length from a left side to a right side as shown in FIG. 9, corresponds to the number of feature channels within each feature map).

Starting at input image tile 902 (herein also referred to as an input layer), data corresponding to a medical image may be input and mapped to a first feature map. In some embodiments, the input data corresponds grayscale pixel/voxel intensity values. In some embodiments, the input data corresponds to pixel/voxel intensity values in a plurality of color channels. The input data may correspond to two-dimensional (2D) or three-dimensional (3D) medical images. In some embodiments, the input data is pre-processed (e.g., normalized) before being processed by deep neural network architecture 900.

Take a specific configuration as an example for the purpose of illustration. Input image tile 902 includes a feature map comprising 572×572×K feature values, corresponding to pixel intensity values of a 572×572 2D medical image having K color channels. In some embodiments, K may be greater than one, wherein the input image tile comprises a separate feature channel for each of the K color channels. For example, in an RGB pixel color model, K may be three, and the input image tile 902 may comprise 572×572 intensity values per each of the three color channels, for a total of 572×572×3 input values/features. In some embodiments, K may be one, such as in a a grayscale/black-and-white color scheme.

As indicated by the solid black rightward pointing arrow immediately to the right of input image tile 902, a 3×3×K convolution of the input image tile 902 is performed to produce feature map 904. As discussed above, a 3×3 convolution includes mapping a 3×3×$j_{i-1}$ group of feature values from an i-1$^{th}$ feature map to a single feature value of an i$^{th}$ feature map using a 3×3×$j_{i-1}$ convolutional filter. For each distinct convolutional filter applied to the i-1$^{th}$ feature map, a feature channel is added to the i$^{th}$ feature map, thus the number of distinct filters applied to an input feature map corresponds to the number of feature channels in the output feature map. In deep neural network architecture 900, 64 distinct filters are applied to the input image tile 902, thereby generating feature map 904, comprising 64 feature channels. Each of the 64 distinct filters comprise a distinct group of learned weights, with a fixed positional relationship with respect to each other filter weight in the group. The increase in feature channels between input image tile 902 and feature map 904 is indicated by an increase in the left-right width of feature map 904 compared to input image tile 902. The 3×3 convolutions of deep neural network architecture 900 comprise step sizes of 1, and therefore result in a loss of a 1 pixel border from the input image for each 3×3 convolution applied. Therefore, feature map 904 includes a spatial resolution of 570×570 (that is, two feature channels are lost in the x dimension and two feature channels are lost in the y dimension).

Feature map 904 includes 570×570×64 feature values. As indicated by the solid black rightward pointing arrow immediately to the right of feature map 904, a 3×3 convolution is performed on feature map 904 to produce feature map 906.

Feature map 906 includes 568×568×64 feature values. As indicated by the downward pointing arrow beneath feature map 906, a 2×2 max pooling operation is performed on feature map 906 to produce feature map 908. Briefly, a 2×2 max pooling operation includes determining a max feature value from a 2×2 grid of feature values from a single feature channel an immediately preceding feature map, and setting a single feature value, in a single feature channel, of a current feature map, to the max value so determined. The 2×2 max pooling employed herein includes a step size of two. 2×2 max pooling thereby combines output from 4 feature values (2 in the x dimension and 2 in they dimension) to produce a reduced spatial resolution feature map (the output feature map will comprise half the number of feature values in the x direction and half the number of feature values in the y direction. Or said another way, the output feature map will comprise one fourth the number of feature values (per feature channel) compared to the input feature map). 2×2 max pooling does not alter the number of feature channels, as pooling is applied separately to each distinct feature channel of the input feature map, e.g., features between multiple feature channels are not combined. Additionally, a copy of feature map 906 is cropped and concatenated with output from feature map 948 to produce feature map 950, as indicated by the dash-tailed rightward pointing arrow immediately to the right of feature map 906.

Feature map 908 includes 284×284×64 feature values (a fourth the spatial resolution of feature map 906, due to the 2×2 max pooling) with 64 features per channel. As indicated by the solid black rightward pointing arrow immediately to the right of feature map 908, a 3×3 convolution is performed on feature map 908 to produce feature map 910.

Feature map 910 includes 282×282×128 feature values. As indicated by the solid black rightward pointing arrow immediately to the right of feature map 910, a 3×3 convolution is performed on feature map 910 to produce feature map 912.

Feature map 912 includes 280×280×128 feature values. As indicated by the downward pointing arrow beneath feature map 912, a 2×2 max pooling operation is performed on feature map 912 to produce feature map 914, wherein feature map 914 is of one fourth the spatial resolution of feature map 912. Additionally, feature map 912 is cropped, copied, and concatenated with output from feature map 942 to produce feature map 944, as indicated by the dash-tailed rightward pointing arrow immediately to the right of feature map 912.

Feature map 914 includes 140×140×128 feature values. As indicated by the solid black rightward pointing arrow immediately to the right of feature map 914, a 3×3 convolution is performed on feature map 914 to produce feature map 916.

Feature map 916 includes 198×198×256 feature values. As indicated by the solid black rightward pointing arrow immediately to the right of feature map 916, a 3×3 convolution is performed on feature map 916 to produce feature map 918.

Feature map 918 includes 196×196×256 feature values. As indicated by the downward pointing arrow beneath feature map 918, a 2×2 max pooling operation is performed on feature map 918 to produce feature map 920, wherein feature map 920 is of one fourth the spatial resolution of feature map 918. Additionally, feature map 918 is cropped, copied, and concatenated with output from feature map 936 to produce feature map 938, as indicated by the dash-tailed rightward pointing arrow immediately to the right of feature map 918.

Feature map 920 includes 68×68×256 feature values. As indicated by the solid black rightward pointing arrow immediately to the right of feature map 920, a 3×3 convolution is performed on feature map 920 to produce feature map 922.

Feature map 922 includes 66×66×512 feature values. As indicated by the solid black rightward pointing arrow immediately to the right of feature map 922, a 3×3 convolution is performed on feature map 922 to produce feature map 924.

Feature map 924 includes 64×64×512 feature values. As indicated by the downward pointing arrow beneath feature map 924, a 2×2 max pooling operation is performed on feature map 924 to produce feature map 926, wherein feature map 926 is of one fourth the spatial resolution of feature map 924. Additionally, feature map 924 is cropped, copied, and concatenated with output from feature map 930 to produce feature map 932, as indicated by the dash-tailed rightward pointing arrow immediately to the right of feature map 924.

Feature map 926 includes 925×925×512 feature values. As indicated by the solid black rightward pointing arrow immediately to the right of feature map 926, a 3×3 convolution is performed on feature map 926 to produce feature map 928.

Feature map 928 includes 90×90×1024 feature values. As indicated by the solid black rightward pointing arrow immediately to the right of feature map 928, a 3×3 convolution is performed on feature map 928 to produce feature map 930.

Feature map 930 includes 28×28×1024 feature values. As indicated by the upward pointing arrow immediately above feature map 930, a 2×2 up-convolution is performed on feature map 930 to produce a first portion of feature map 932, while copied and cropped feature values from feature map 924 are used to produce a second portion of feature map 932. Briefly, a 2×2 up-convolution includes mapping a 1×1×$j_{i-1}$ group of feature values in an input feature map to a 2×2×1 group of feature values in a current feature map using a 2×2×$j_{i-1}$ filter (that is, features corresponding to each feature channel at a single spatial position of an input feature map are mapped to four spatial positions of a single feature channel of the output feature map). For each distinct upconvolutional filter applied to an input feature map, a single feature channel is produced in an output feature map. In the upconvolution of feature map 930, 512 distinct upconvolutional filter are applied, and an additional 512 feature channels are added from the copied and cropped feature map 924, to produce feature map 932 with 1024 feature channels.

Feature map 932 includes 56×56×1024 feature values. As indicated by the solid black rightward pointing arrow immediately to the right of feature map 932, a 3×3 convolution is performed using 512 distinct convolutional filters on feature map 932 to produce feature map 934.

Feature map 934 includes 54×54×512 feature values. As indicated by the solid black rightward pointing arrow immediately to the right of feature map 934, a 3×3 convolution is performed on feature map 934 using 512 distinct convolutional filters to produce feature map 936.

Feature map 936 includes 52×52×512 feature values. As indicated by the upward pointing arrow immediately above feature map 936, a 2×2 upconvolution is performed using 256 distinct up convolutional filters on feature map 936 to produce a first portion of feature map 938, while copied and cropped features from feature map 918 produce a second portion of feature map 938.

Feature map 938 includes 104×104×512 feature values. As indicated by the solid black rightward pointing arrow immediately to the right of feature map 938, a 3×3 convolution is performed on feature map 938 using 256 distinct convolutional filters to produce feature map 940.

Feature map 940 includes 102×102×256 feature values. As indicated by the solid black rightward pointing arrow immediately to the right of feature map 940, a 3×3 convolution is performed on feature map 940 using 256 distinct convolutional filters to produce feature map 942.

Feature map 942 includes 100×100×256 feature values. As indicated by the upward pointing arrow immediately above feature map 942, a 2×2 upconvolution is performed on feature map 942 using 128 distinct upconvolutional filters to produce a first portion of feature map 944, while copied and cropped features from feature map 912 are used to produce the second portion of feature map 944.

Feature map 944 includes 200×200×256 feature values. As indicated by the solid black rightward pointing arrow immediately to the right of feature map 944, a 3×3 convolution is performed on feature map 944 using 128 distinct convolutional filters to produce feature map 946.

Feature map 946 includes 198×198×128 feature values. As indicated by the solid black rightward pointing arrow immediately to the right of feature map 946, a 3×3 convolution is performed on feature map 946 using 128 distinct convolutional filters to produce feature map 948.

Feature map 948 includes 196×196×128 feature values. As indicated by the upward pointing arrow immediately above feature map 948, a 2×2 upconvolution is performed on feature map 948 using 64 distinct convolutional filters to produce a first portion of feature map 950, while copied and cropped features from feature map 906 are used to produce a second portion of feature map 950.

Feature map 950 includes 392×392×128 feature values. As indicated by the solid black rightward pointing arrow immediately to the right of feature map 950, a 3×3 convolution is performed on feature map 950 using 64 distinct convolutional filters to produce feature map 952.

Feature map 952 includes 390×390×64 feature values. As indicated by the solid black rightward pointing arrow immediately to the right of feature map 952, a 3×3 convolution is performed on feature map 952 using 64 distinct convolutional filters to produce feature map 954.

Feature map 954 includes 388×388×64 feature values. As indicated by the hollow headed rightward pointing arrow immediately to the right of feature map 954, a 1×1 convolution is performed on feature map 954 using P distinct convolutional filters, to produce segmentation masks 956, wherein P is the number of distinct segmentation masks to be output by deep neural network architecture 900. Briefly, a 1×1 convolution comprises determining a dot product between a 1×1×$j_{i-1}$ group of feature values from an i-$1^{th}$ feature map and a 1×1×$j_{i-1}$ convolutional filter, wherein $j_{i-1}$ is a number of feature channels in the i-$1^{th}$ feature map. The dot product may then be passed through an activation function to produce a feature value for an $i^{th}$ feature map.

Segmentation masks 956 include 388×388×P feature values, wherein P is the number of distinct segmentation masks produced. In some embodiments, a distinct segmentation mask may be determined for each of P distinct anatomical features from a single input image tile in a single pass through deep neural network architecture 900. The series of convolutions, pooling, activations, and upconvolutions, therefore result in a reduction of resolution of the input image tile 902 from 572×572 pixels to an output segmentation mask resolution of 388×388 pixels. Segmentation masks 956 may comprise a plurality (P) of matrices, each matrix comprising a plurality of values indicating a classification of a corresponding pixel of input image tile 902 for a particular anatomical feature. In one example, a first segmentation mask comprising 388×388×1 values, may indicate an area of a medical image occupied by a first anatomical feature, wherein the 388×388×1 values may indicate a probability of a corresponding pixel belonging to the first anatomical feature of interest. In some embodiments, the segmentation mask may be binary, and pixels identified as belonging to an anatomical feature of interest may be set to a first value, while pixels identified as not belonging to the anatomical feature of interest may be set to a second value.

In this way, deep neural network architecture 900 may enable segmentation/classification of a plurality of pixels/voxels of a medical image.

It should be understood that the architecture and configuration of CNN 900 shown in FIG. 9 is for illustration, not for limitation. Any appropriate neural network can be used herein for segmenting medical images and/or determining other positional attributes of input medical images, such as ResNet, autoencoder, recurrent neural networks, General Regression Neural Network (GRNN), etc.

Figure 10:
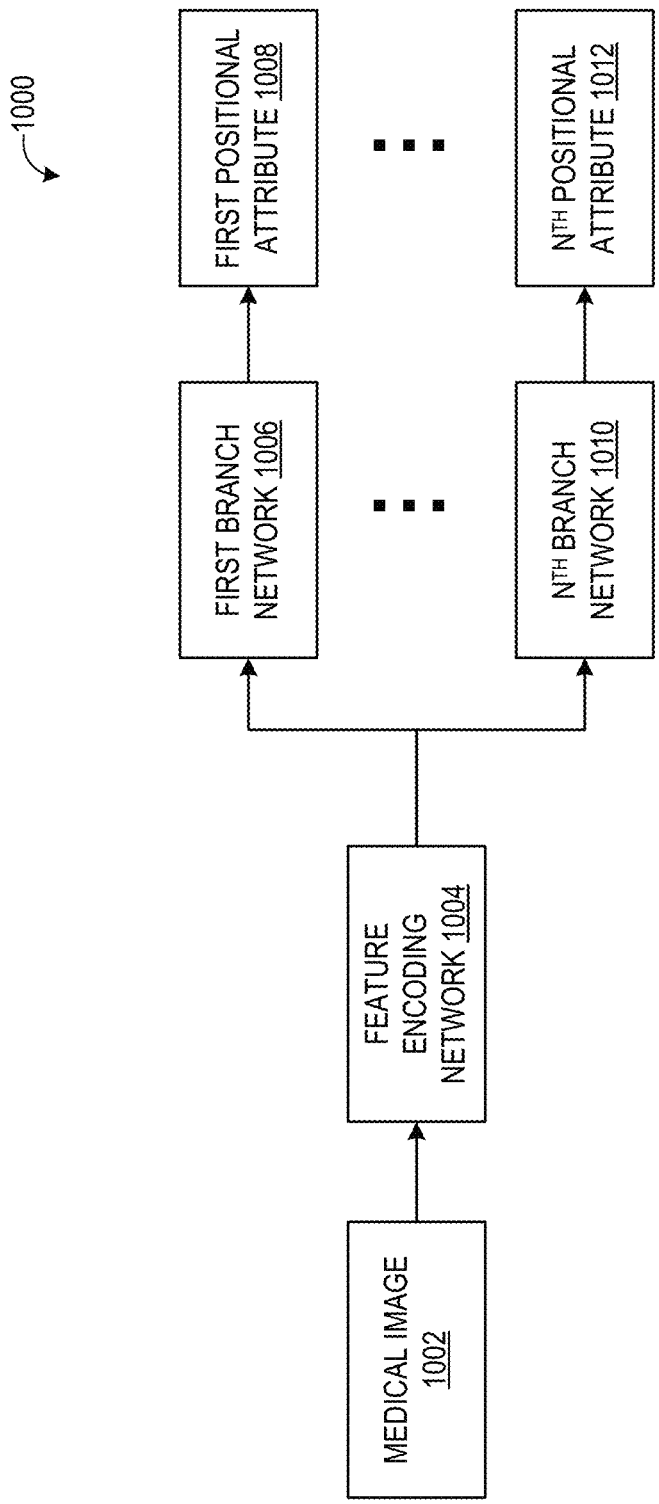
FIG. 10 shows an embodiment of a multi-tasking deep neural network configured to map medical images to two or more positional attributes.

Turning to FIG. 10, an exemplary embodiment of a multi-tasking deep neural network 1000 is shown. Multi-tasking deep neural network 1000 may be implemented by a medical imaging system to rapidly map a medical image to a plurality of distinct positional attributes for an anatomical feature, wherein the plurality of positional attributes may be used in accordance with one or more of the methods disclosed herein to determine image quality metrics. In some embodiments, multi-tasking deep neural network 1000 may be stored in memory of an image processing system, such as in deep neural network module 208 of image processing system 202 shown in FIG. 2. Multi-tasking deep neural network 1000 may be indexed in memory based on imaging protocol, thereby linking a location in memory where multi-tasking deep neural network 1000 is stored, and one or more imaging protocols for which multi-tasking deep neural network 1000 may be employed to determine one or more image quality metrics. In this way, multi-tasking deep neural network 1000 may be rapidly loaded from memory, which may reduce image assessment latency during an imaging process.

Multi-tasking deep neural network 1000 comprises a feature encoding network 1004, which is configured to receive medical images, such as medical image 1002, and map said medical images to corresponding encoded feature maps. Said feature maps may comprise a multi-dimensional matrix or array of feature values, wherein said feature values provide spatially coherent encoded information extracted from input medical image 1002. In some embodiments, the feature encoding network 1004 may comprise a convolutional neural network, comprising one or more convolutional layers, such as are described in more detail above with reference to FIG. 9.

The encoded feature map produced by feature encoding network 1004 is fed to each of a plurality of branch networks, including first branch network 1006 and $N^{th}$ branch network 1010, wherein each branch network receives a copy of the encoded feature map from a shared feature encoding network 1004. FIG. 10 shows only two distinct branch networks, for simplicity, however it will be appreciated that multi-tasking deep neural network 1000 may comprise any positive integer number of branch networks greater than one. By sharing an encoded feature map produced by a single feature encoding network 1004, a speed of inference may be increased in comparison to a plurality of separate deep neural networks with no shared layers, as a total number of calculations, as well as a total number of parameters, may be reduced. Further, by sharing a feature encoding network 1004, the multi-tasking deep neural network 1000 occupies less memory than N separate networks (wherein N is the total number of branch networks), and may be trained in a shorter duration of time, as well as be less susceptible to overfitting.

Each of the plurality of branch networks, including first branch network 1006 to $N^{th}$ branch network 1010, may comprise a distinct number, type, and arrangement, of layers. Further, each of the plurality of branch networks may comprise a distinct set of parameters (e.g., weights and biases). In some embodiments, two or more branch networks may share a common architecture, that is, may have a same number, type, and arrangement of layers, but may comprise distinct parameter values. Each of the plurality of branch networks may output a distinct positional attribute, such as first positional attribute 1008 produced by first branch network 1006, and $N^{th}$ positional attribute 1012 produced by $N^{th}$ branch network 1010. In some embodiments, first positional attribute 1008, output by first branch network 1006, may comprise a segmentation map of an anatomical feature, whereas output from $N^{th}$ branch network 1010 may comprise a classification score indicating a probability that an input medical image includes the anatomical feature in the field of view. The plurality of branch networks may include both classification networks, and regression networks, that is, networks trained to predict a discrete classification label (e.g., predict a label from the set of labels A, B, and C) and networks trained to predict a real valued number (e.g., predict an area of coverage of lungs shown in a medical image).

When determining a plurality of positional attributes for a single anatomical feature, computational efficiency and prediction accuracy may be improved by extracting an encoded representation of said anatomical feature using a shared feature encoding network 1004. By sharing a common feature encoding network for a plurality of downstream prediction tasks for a same anatomical feature, the feature encoding network 1004 learns to map medical images to a balanced encoded representation, as the encoded representation is general enough to inform prediction of a diverse set of positional attributes. Further, as the plurality of positional attributes are determined from a common/shared encoded representation, and pertain to a common/shared anatomical feature, coherence between the plurality of positional attributes may be enhanced. As an example, if a first neural network is tasked with determining if a medical image contains, or does not contain an anatomical feature, and a second, separate, neural network is tasked with determining a size of said anatomical feature, it is possible that the first neural network determine the anatomical feature is not present in the medical image, and the second neural network determine that the anatomical feature has a size of 48 pixels. This is incoherence, and may arise when deep neural networks separately learn to extract an encoded representation of a medical image. The inventors herein have realized that by sharing a feature encoding network when determining a plurality of positional attributes of a single anatomical feature, coherence of the positional attributes is improved, which is particularly advantageous in determining quantitative image quality metrics.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    acquiring a medical image of an anatomical region;
    mapping the medical image to a positional attribute of an anatomical feature using a trained deep neural network;
    determining an image quality metric based on the positional attribute of the anatomical feature;
    determining if the image quality metric satisfies an image quality criterion; and
    responding to the image quality metric not satisfying the image quality criterion by:
        displaying the medical image, the image quality metric, and an indication of the unsatisfied image quality criterion, via a display device,
    wherein mapping the medical image to the positional attribute of the anatomical feature using the trained deep neural network comprises:
    mapping the medical image to a segmentation mask of the anatomical feature; and
    determining one or more of a length, a width, a center point, an area, and an orientation of the anatomical feature, based on the segmentation mask.

2. The method of claim 1, the method further comprising:
    responding to the image quality metric satisfying the image quality criterion by:
        displaying the medical image, the image quality metric, and an indication of the satisfied image quality criterion, via the display device.

3. The method of claim 1, wherein the positional attribute is one or more of a location of the anatomical feature with respect to the medical image, an orientation of the anatomical feature with respect to the medical image, an area of the anatomical feature with respect to the medical image, and a classification score indicating a probability of inclusion of the anatomical feature within a field of view of the medical image.

4. The method of claim 1, wherein the image quality metric includes one or more of a costophrenic angle, a cardiothoracic ratio, a mediastinal width, an angle of rotation of an imaging subject with respect to a projection plane of the medical image, and an extent of inspiration of lungs of the imaging subject.

5. The method of claim 1, wherein the trained deep neural network, the image quality metric, and the image quality criterion, are indexed in non-transitory memory based on an imaging protocol used to acquire the medical image.

6. The method of claim 1, wherein the image quality metric is an angle of rotation of an imaging subject with respect to a projection plane of the medical image, and wherein determining the image quality metric based on the positional attribute of the anatomical feature includes:
    determining a first distance between a first location of a first anatomical feature and a second location of a second anatomical feature;
    determining a second distance between the second location of the second anatomical feature and a third location of a third anatomical feature;
    determining a ratio between the first distance and the second distance; and
    determining the angle of rotation of the imaging subject with respect to the projection plane based on the ratio.

7. The method of claim 6, wherein determining if the image quality metric satisfies the image quality criterion comprises:
    accessing a pre-determined rotation range;
    comparing the angle of rotation with the pre-determined rotation range; and
    responding to the angle of rotation not falling within the pre-determined rotation range by updating a status of the image quality criterion to indicate the angle of rotation does not match the pre-determined rotation range.

8. A method, comprising:
    acquiring a medical image of an anatomical region;
    mapping the medical image to a positional attribute of an anatomical feature using a trained deep neural network;
    determining an image quality metric based on the positional attribute of the anatomical feature;
    determining if the image quality metric satisfies an image quality criterion; and
    responding to the image quality metric not satisfying the image quality criterion by:
        displaying the medical image, the image quality metric, and an indication of the unsatisfied image quality criterion, via a display device,
    wherein the image quality metric is an extent of clipping of the anatomical feature, and wherein determining if the image quality metric satisfies the image quality criterion comprises:
    determining if the extent of clipping of the anatomical feature is below a threshold extent of clipping; and
    responding to the extent of clipping of the anatomical feature being below the threshold extent of clipping by:
        setting a status of the image quality criterion to a value indicating the criterion is satisfied.

9. The method of claim 8, the method further comprising:
    responding to the image quality metric satisfying the image quality criterion by:
        displaying the medical image, the image quality metric, and an indication of the satisfied image quality criterion, via the display device.

10. The method of claim 8, wherein the positional attribute is one or more of a location of the anatomical feature with respect to the medical image, an orientation of the anatomical feature with respect to the medical image, an area of the anatomical feature with respect to the medical image, and a classification score indicating a probability of inclusion of the anatomical feature within a field of view of the medical image.

11. The method of claim 8, wherein the trained deep neural network, the image quality metric, and the image quality criterion, are indexed in non-transitory memory based on an imaging protocol used to acquire the medical image.

12. A method, comprising:
receiving an imaging protocol selection;
acquiring a medical image based on the imaging protocol selection;
mapping the medical image to a first positional attribute of a first anatomical feature using a trained deep neural network;
mapping the medical image to a second positional attribute of a second anatomical feature using a second trained deep neural network;
determining an image quality metric based on the first positional attribute of the first anatomical feature and the second positional attribute of the second anatomical feature;
determining if the image quality metric satisfies an image quality criterion; and
responding to the image quality metric satisfying the image quality criterion by:
displaying the medical image, the image quality metric, and an indication of the satisfied image quality criterion, via a display device,
wherein the first positional attribute is a first segmentation mask of the first anatomical feature, and the second positional attribute is a second segmentation mask of the second anatomical feature, and
wherein the image quality metric is an extent of overlap between the first anatomical feature and the second anatomical feature, wherein the extent of overlap between the first anatomical feature and the second anatomical feature is determined based on an extent of intersection between the first segmentation mask and the second segmentation mask.

13. The method of claim 12, wherein the first trained deep neural network and the second trained deep neural network share one or more feature encoding layers.

14. The method of claim 12, wherein determining if the image quality metric satisfies the image quality criterion comprises determining if the extent of overlap between the first anatomical feature and the second anatomical feature is less than a threshold extent of overlap.

* * * * *